CONNECTOR FOR PRINTED CIRCUIT EDGEBOARD OR STRIP CABLE

Filed Dec. 30, 1965 3 Sheets-Sheet 1

AKIN AKSU
CARLOS L. BEECK
JOHN M. BROWN
JOHN M. LEWIS
ORBERT S. SMITH
ROBERT STRICH
INVENTORS.
BY Huebner & Worrel
ATTORNEYS.

CONNECTOR FOR PRINTED CIRCUIT EDGEBOARD OR STRIP CABLE

Filed Dec. 30, 1965 3 Sheets-Sheet 2

AKIN AKSU
CARLOS L. BEECK
JOHN M. BROWN
JOHN M. LEWIS
ORBERT S. SMITH
ROBERT STRICH
INVENTORS.

BY Huebner & Worrel
ATTORNEYS.

AKIN AKSU
CARLOS L. BEECK
JOHN M. BROWN
JOHN M. LEWIS
ORBERT S. SMITH
ROBERT STRICH
INVENTORS
By Huebner & Worrel
ATTORNEYS.

United States Patent Office 3,329,926

Patented July 4, 1967

3,329,926

CONNECTOR FOR PRINTED CIRCUIT EDGE-BOARD OR STRIP CABLE

Akin Aksu, Anaheim, Carlos Luis Beeck, Newport Beach, John Marion Brown, Whittier, John Miller Lewis, Anaheim, Orbert Schenley Smith, Fountain Valley, and Robert Strich, Santa Ana, Calif., assignors to International Telephone and Telegraph Corporation, New York, N.Y., a corporation of Maryland Filed Dec. 30, 1965, Ser. No. 517,618
14 Claims. (Cl. 339—176)

This invention relates to electrical connectors, and in particularly to a connector for use with a printed circuit board or strip cable, or the like.

An object of the invention is to provide a connector socket for mating with a connector plug in the form of a printed circuit board or strip cable, the latter preferably being folded back over a flat wedge member, wherein the connector socket utilizes one or a plurality of terminal members in th e form of wire possessing spring characteristics, each partially confined in a groove of an insulation block and initially disposed out of the path of the printed circuit edgeboard to be inserted, whereby the edgeboard may be inserted into the socket with a minimum force, sometimes referred to as zero insertion force, said terminal member having a preformed bow with its convex side facing toward the position of the conductor element of the printed circuit edgeboard, the forward end of the terminal member being engaged by a section of a pressure block which is moved rearwardly against the end of the terminal member after the printed circuit edgeboard is inserted, and which results in the terminal member being forced against the conductor element of the edgeboard for effective contact purposes, first by a wiping action and finally by a full contact in the nature of a clamping action.

A further object of the invention is to utilize as an element in the connector socket described above a twisted, or helically wound, or braided wire, terminal member to provide a multiplicity or redundancy of contact areas between the terminal member and the conductor element of the printed circuit edgeboard.

An additional object of the invention is to incorporate in the pressure block means to assist in maintaining proper orientation of the wire terminal section.

These and other objects and advantages of the invention will become more apparent from a consideration of the description which follows taken in conjunction with the drawings.

Figures 1, 2:
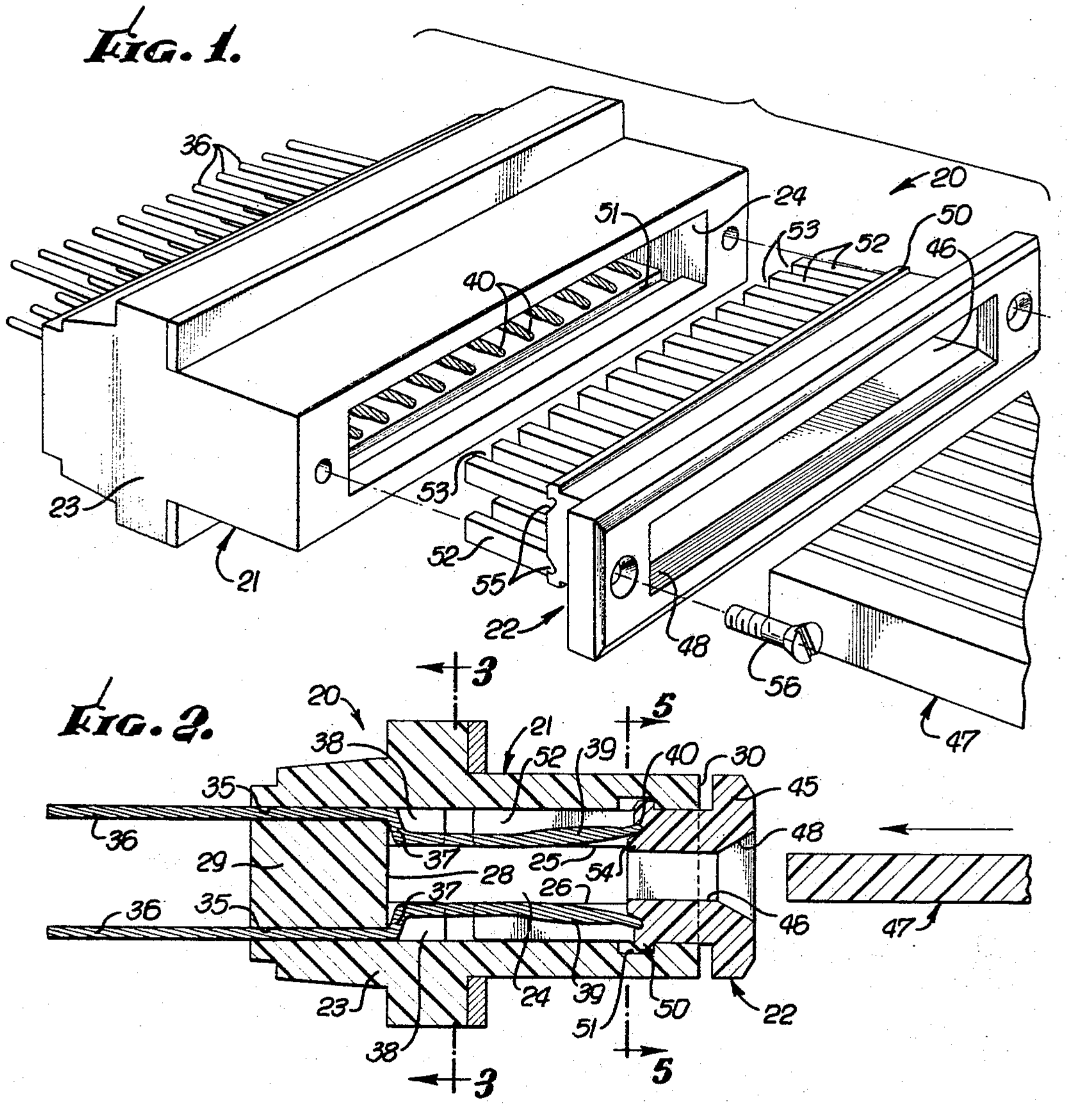
FIGURE 1 is a perspective view of the connector socket embodying the invention with the insulation block and pressure block separated. This figure also illustrates a fragmentary portion of a printed circuit edgeboard which is to function as the plug element of the assembled connector.
FIGURE 2 is a vertical cross section of the elements illustrated in FIGURE 1 with the pressure block lodged in its initial position in the insulator block.
Figure 3:
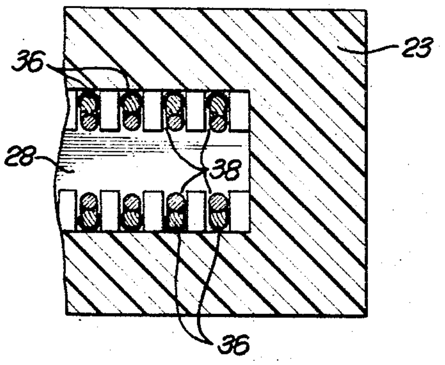
FIGURE 3 is a fragmentary cross section taken on the line 3—3 of FIGURE 2.

The connector socket 20 comprises two principal parts, a pin terminal assembly 21 and a pressure block 22.

The assembly 21 comprises an insulation block 23 having a bore therein 24, whose upper and lower wall surfaces 25 and 26, respectively, are of generally flat plane configuration and are parallel. Such bore extends from a wall 28 of the rearward end portion 29 of the insulation block through the forward end 30 of the block.

Figure 10:
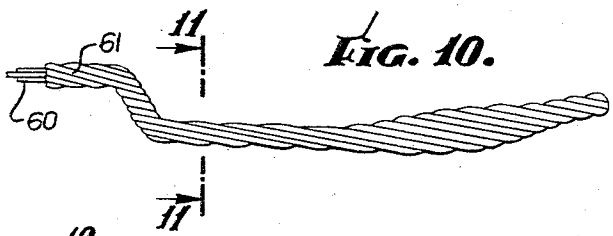
FIGURE 10 is an enlarged fragmentary side view showing a terminal portion made of twisted wires on a central core.
Figure 13:
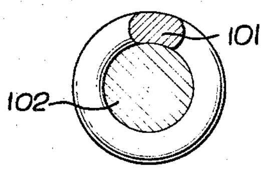
FIGURE 13 is a magnified cross sectional view of the form of wire terminal member shown in FIGURE 12.

The rear end portion of the insulation block is provided with small individual bores 35 for mounting terminal wire members 36. Forwardly from the wall 28 for a short distance, the bore is formed with grooves 38 in which a short rearward section of the wire members 36 are confined. The latter are bent inwardly as at 37 adjacent the rear wall 28 of the bore 24, whereby the terminal wire members are inhibited against rearward movement in the block. The forward sections of each terminal member are provided with a preformed bow 39 terminating at a forward end 40. Preferably, but not necessarily, the central portion of the preformed bow is diametrically expanded as illustrated in FIGURES 2 and 10 to provide a greater diameter and springiness and an over-all larger aggregate contact surface. This can be accomplished in a manner subsequently described.

The pressure block 22 includes an elongated frame 45 having a rectangular passage 46 therein adequate for the free insertion of a printed circuit edgeboard 47, a champfer 48 forming an entrance ramp. The frame 45 preferably is provided with upper and lower straight elongated ribs 50 which can be snapped through the entrance of the bore 24 and lodged in transversely elongated recesses 51 opening off of the bore 24. This is for the purpose of enabling the pressure block to be preliminarily associated with the insulation block in proper position for final assembling of the connector. The material of the pressure block should be firm but sufficiently resilient to be yieldable for the purpose described.

The frame 45 carries a plurality of fingers 52 which are rectangular in section, are spaced apart and parallel. The spacing forms a plurality of slots 53 corresponding in number and in alignment with the grooves 38, and these slots confine the terminal sections 39. Adjacent the base of the fingers the frame presents an abutment member 54 having transversely elongated notches 55 to engage the forward ends 40 of the terminal members and restrain these ends against vertical slippage.

Figure 4:
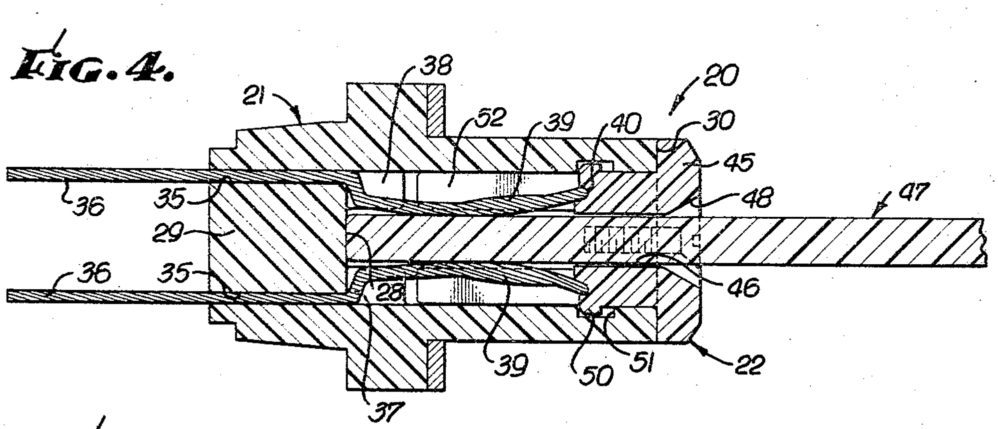
FIGURE 4 is a view similar to FIGURE 2 showing the printed circuit edgeboard fully inserted and the pressure block advanced into its final position.
Figure 5:
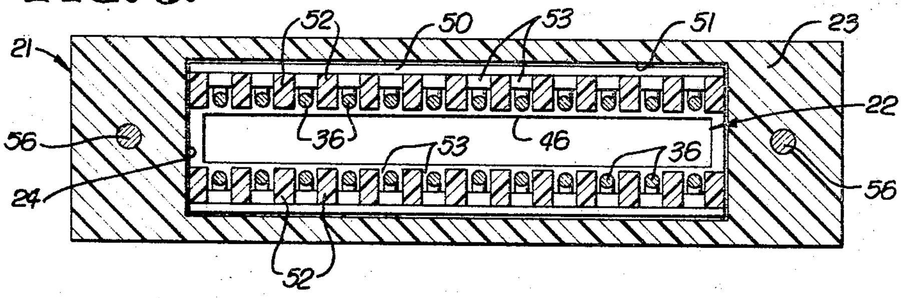
FIGURE 5 is a cross section taken on the line 5—5 of FIGURE 2.

Machine screws 56 may be employed to advance the pressure block 45 into the insulation block 21 and permanently retain the two parts in the final position as shown in FIGURE 4. Manual advancement is also possible, and any suitable alternative means for retention may be employed, as, for example, a snap lock (not shown).

Figure 11:
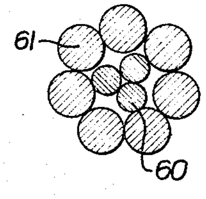
FIGURE 11 is a magnified cross sectional view of the form of twisted wire pin terminal member shown in FIGURE 10.

One example of the terminal member construction is shown enlarged in FIGURES 10 and 11. Here, a core of spring wires 60 which may be twisted together in one direction, is surrounded by a plurality of spring wires 61 which are twisted in the opposite direction. It is preferable to expand this assembly to bulge the wires 61 in the contact region by applying opposite axial pressure to the wire assembly. Also, the wire assembly, at least in the bulged portion, should be given a bow set, and when installed in the insulation block the convex side of the bow should face in the direction of contact with the printed circuit edgeboard.

In use, the pressure block 22 is preliminarily inserted into the insulation block 21 as shown in FIGURE 2, and the printed circuit edgeboard 47 or a generally similarly shaped strip cable terminal with the insulation removed from the ribbon conductors is slipped into place in the position shown in FIGURE 4. The terminal wire members within the bore 24 initially repose entirely within the grooves 38 and slots 53, and the bore 24 is of such dimensions that insertion of the printed circuit edgeboard 47 is attained with minimal force, the passage 46 in the pressure block being also designed for that type of accommodation.

After the printed circuit edgeboard is in place the pressure block is further advanced into the bore 24 against the ends 40 of the terminal sections; as noted, this can be accomplished either manually or by insertion of the screws 56, and movement of the pressure block in the direction described causes a shortening of the cord of the bow on each terminal section and consequently a wiping and finally a clamping type of pressure contact of the terminal section 39 with the surface of the corresponding conductor on the printed circuit edgeboard. Moreover, by utilizing a terminal section made up of twisted wires or other form of broken surface, such as a helically wound covering, or a braided covering, on a core, multiple or redundancy of contact areas between the terminal portion and the printed circuit edgeboard is achieved. This is even further enhanced if all or part of the terminal section is expanded as illustrated in FIGURES 2, 4 and 10.

Figure 6:
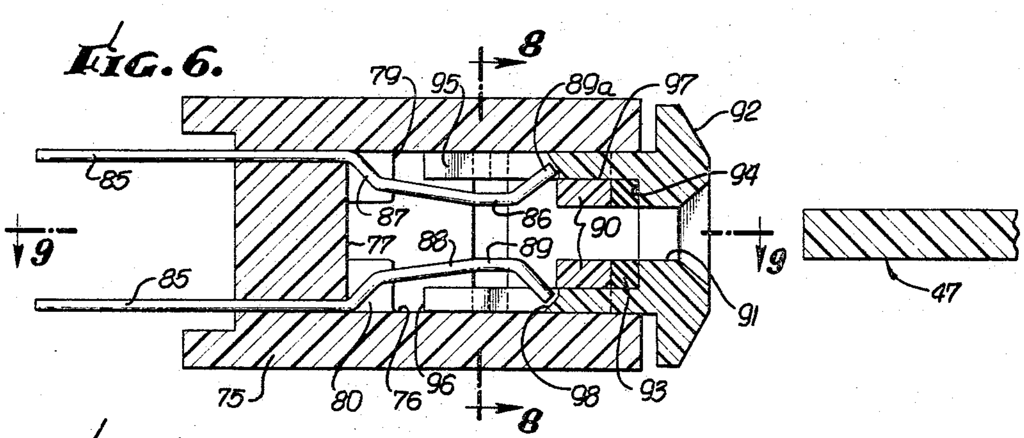
FIGURE 6 is a view similar to FIGURE 2 of a second form of the invention.

FIGURE 6 illustrates a somewhat different form of connector. Insulation block 75 is formed with the same general type of bore 76 as in the form of FIGURE 2, and from the rear wall 77 extending forwardly into the bore 78 is a plurality of short partitions 79 forming parallel grooves 80. The wire terminal members 85 in this instance incorporate contact sections 86 which are formed of single spring wire preformed into the configuration illustrated in FIGURE 6. In this form the wire has an oblique bend 87 at the shoulder provided by the rear wall 77, which bend is followed forwardly by a reverse angular bend 88, thence a section 89 substantially parallel to the plane of the vertically opposite walls of the bore, and terminating with an angular section 89*a* extending outwardly toward one of said vertically opposite walls of the bore.

The insulation block 75 includes transverse bars 90 extending from side to side and having opposing surfaces coinciding with the passage 91 in the pressure block 92. These bars 90 offer abutments for resilient sealing strips 93.

The pressure block 92 is formed with transverse notches 94 to receive the sealing strips 93, and relatively shallow slots 95 are provided by extending fingers 96 which latter are of such dimension as to slide between the outermost surfaces 97 of the transverse bars 90 and the respectively adjacent parallel faces of the bore.

The pressure block 92 embodies notches 98 for engagement with the forward ends of the wire terminals 85.

Figure 7:
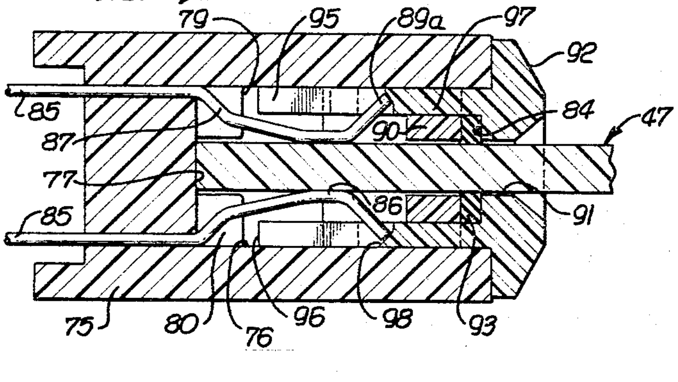
FIGURE 7 is a sectional view similar to FIGURE 4 of the form illustrated in FIGURE 6.
Figure 8:
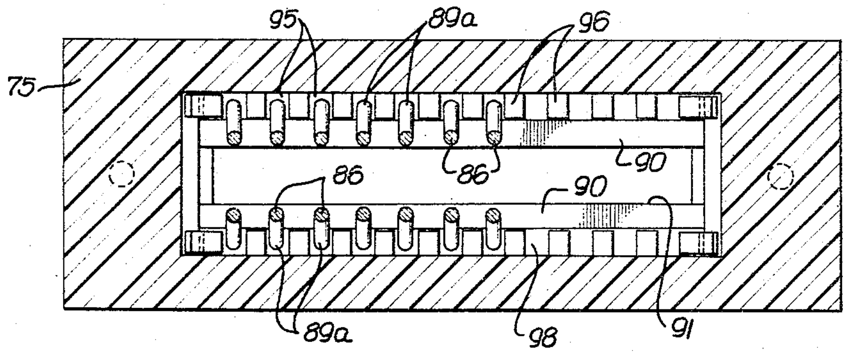
FIGURE 8 is a sectional view taken on the line 8—8 of FIGURE 6.
Figure 9:
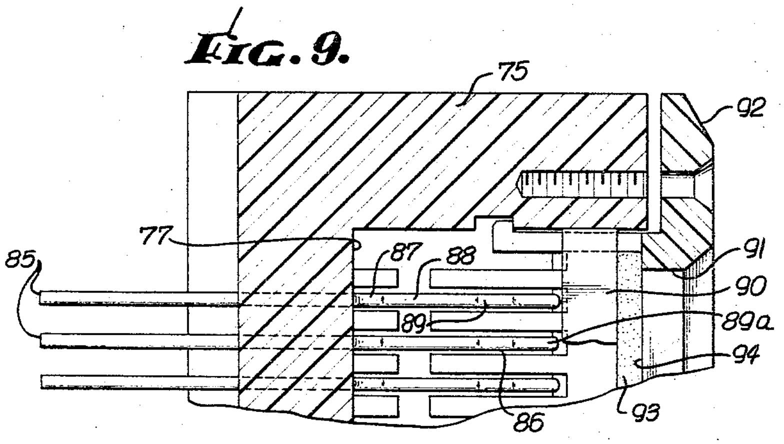
FIGURE 9 is a sectional view taken on the line 9—9 of FIGURE 6.

The general operation of the form shown in FIGURE 6 is comparable to that of the form illustrated in FIGURE 2, namely, upon advance of the pressure block 92 engagement against the forward ends of the contact terminals 85 shortens the over-all cord of each angularly curved wire terminal and consequently decreases the general radius, pushing the flattened section 86 into wiping and clamping contact with the printed circuit edgeboard 47; and in this form the sealing strips 93 are compressed between the pressure block and the contiguous surfaces of the bars 90. (See FIGURE 7.)

In both forms, the angular section of the terminal wire lying in the groove 38 (FIGURE 2) or groove 80 (FIGURE 6) prevents rotation of the wire, and maintains the terminal section of the wire in proper position with the convex side of the bowed portion toward the vertical center of the main bore so that proper alignment of the terminal section and the mating conductor in the edgeboard will be assured. Additional confinement for the same purpose is contributed in the form of FIGURE 2 by the finger slots 53, and to some extent in the form of FIGURE 6 by the shallower slots 95.

Figure 12:
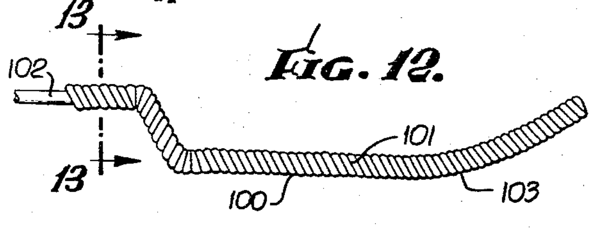
FIGURE 12 is an enlarged fragmentary side view showing a terminal portion made of wire helically wound on a central core.

In FIGURE 12 the terminal section 100 is formed by helically winding a wire 101 on a wire core 102, and a preformed bow 103 is provided.

Figure 14:
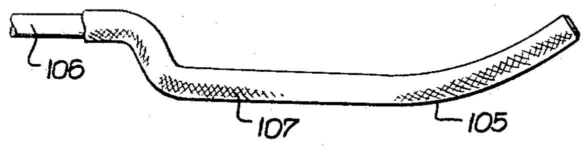
FIGURE 14 is a fragmentary side view illustrating a terminal member which features a metallic sheath for the terminal portion.

FIGURE 14 illustrates an alternative terminal section 105 comprising a wire core 106 covered by a wire sheathing 107.

Although there is herein shown and described what is conceived to be the most practical and preferred embodiments of the invention, it is recognized that departures may be made therefrom within the scope of the invention, which is not to be limited to the details disclosed herein but is to be accorded the full scope of the claims so as to embrace any and all equivalent devices.

What is claimed is:

1. A connector socket for mating with a connector plug in the form of a printed circuit edgeboard or strip cable comprising: an insulation block having forward and rearward ends, a bore in the block opening through the forward end and defined in part by vertically opposite, generally parallel walls spaced apart a distance greater than the thickness of the plug to be inserted, an elongated spring wire terminal member mounted in the insulation block with a forward section disposed in the bore and entirely vertically offset within a horizontal plane and past which section the plug may be inserted into the bore with minimal force, the forward section terminating with an end within the bore, means securing the terminal member against rearward movement, the terminal member embodying a preformed bow with its convex side disposed toward the vertically opposite wall of the bore and toward the plug when said plug is inserted in said insulation block, a pressure block insertable from the front of the insulation block into the bore and engageable with the forward end of said terminal member, said pressure block having a passage therein for free reception of the connector plug, and said pressure block being movable rearwardly against the forward end of said terminal member to increase the bow and thereby cause a pressure contact between the forward section of the terminal member and the connector plug.

2. A connector socket as defined in claim 1 wherein the insulation block embodies means to prevent rotation of the forward section of the terminal member.

3. A connector socket as defined in claim 1 in which there is disposed at the rear end of the bore parallel walls forming a groove, and the forward section of the wire terminal member embodies an angular offset laterally confined within said groove preventing rotation of said forward section and maintaining proper orientation thereof.

4. A connector socket as defined in claim 3 wherein the pressure block embodies spaced apart parallel fingers forming a slot, said slot being in alignment with said groove and said slot contributing to the lateral confinement and correct orientation of the forward section of the wire terminal member.

5. A connector socket as defined in claim 1 wherein a notch is provided in the pressure block where the forward end of the wire terminal member is engaged by the pressure block, said notch preventing vertical shifting of the said forward end of the terminal member.

6. A connector socket as defined in claim 1 in which is embodied means to retain said pressure block in an advanced position against the forward end of the terminal member.

7. A connector socket as defined in claim 1 in which is mounted a plurality of said wire terminal members in parallel spaced apart pattern coinciding with conductor elements on the plug, and the pressure block is engageable with the forward ends of all of said terminal members.

8. A connector socket as defined in claim 7 in which there is a set comprising a plurality of the spring terminal members in said parallel spaced apart pattern disposed both in the upper and lower regions of said bore, the forward sections of said wire terminal members being vertically spaced apart sufficiently so that the plug may be inserted with substantially zero force, and the pressure block is engageable with both sets of terminal members causing them to shift into pressure contact with both sides of said plug.

9. A connector socket as defined in claim 1 in which means are provided for retaining the pressure block in the bore of the insulation block preliminary to introduction of the plug and reaward pressure movement of the pressure block.

10. A connector socket as defined in claim 9 in which said last named means comprises a recess in the wall of the insulation block opening into the bore, and a protuberance on the pressure block insertable in the recess.

11. A connector socket as defined in claim 1 in which the portion of the forward section of the spring wire terminal member making contact with the plug is a plurality of wires twisted together affording a redundancy of contact surfaces for engagement with the plug.

12. A connector socket as defined in claim 11 in which the forward section of the spring wire terminal member is provided with a preformed bulge, and rearward movement of the pressure block tends to enlarge the bulge and flatten the same against the plug and consequently increase the contact areas of the terminal member on the plug.

13. The combination of: a connector socket, and a mating connector plug of generally flat form having a conductor on the surface thereof, the connector socket comprising an insulation block having forward and rearward ends, a bore in the block opening through the forward end and defined in part by vertically opposite, generally parallel walls spaced apart a distance greater than the thickness of the plug, an elongated spring wire terminal member mounted in the insulation block with a forward section disposed in the bore and entirely vertically offset within a horizontal plane and past which section the plug may be inserted into the bore with minimal force, the forward section terminating with an end within the bore, means securing the terminal member against rearward movement, the terminal member embodying a preformed bow with its convex side disposed toward the vertically opposite wall of the bore and toward the plug when said plug is inserted in said insulation block, a pressure block insertable from the front of the insulation block into the bore and engageable with the forward end of said terminal member, said pressure block having a passage therein for free reception of the connector plug, the connector plug being inserted in the bore of the socket, and said pressure block of the socket being movable rearwardly against the forward end of said terminal member to increase the bow and thereby cause a pressure contact between the forward section of the terminal member and the conductor of the connector plug.

14. A combination as defined in claim 13 in which the socket includes a plurality of said wire terminal members mounted in parallel spaced apart pattern, and the plug embodies a plurality of conductors coinciding in pattern with the wire terminal members and respectively engageable therewith.

References Cited

FOREIGN PATENTS 885,040 12/1961 Great Britain.

MARVIN A. CHAMPION, *Primary Examiner.*

J. R. MOSES, *Assistant Examiner.*